(12) United States Patent
Pletinckx et al.

(10) Patent No.: US 11,988,737 B2
(45) Date of Patent: May 21, 2024

(54) FMCW RADAR SENSOR INCLUDING SYNCHRONIZED HIGH FREQUENCY COMPONENTS

(71) Applicant: Robert Bosch GmbH, Stuttgart (DE)

(72) Inventors: Jo Pletinckx, Sersheim (DE); Robert Korn, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 301 days.

(21) Appl. No.: 17/000,893

(22) Filed: Aug. 24, 2020

(65) Prior Publication Data
US 2021/0072352 A1    Mar. 11, 2021

(30) Foreign Application Priority Data

Sep. 9, 2019   (DE) .................... 102019213621.4
Oct. 2, 2019   (DE) .................... 102019215191.4

(51) Int. Cl.
  *G01S 13/00*   (2006.01)
  *G01S 7/40*    (2006.01)
  *G01S 13/34*   (2006.01)
  *G01S 13/931*  (2020.01)

(52) U.S. Cl.
  CPC .......... *G01S 13/006* (2013.01); *G01S 7/4056* (2013.01); *G01S 13/34* (2013.01); *G01S 13/931* (2013.01)

(58) Field of Classification Search
  CPC ...... G01S 13/006; G01S 7/4056; G01S 13/34; G01S 13/931; G01S 7/356
  See application file for complete search history.

(56) References Cited

U.S. PATENT DOCUMENTS

| | | | | |
|---|---|---|---|---|
| 6,255,987 B1* | 7/2001 | Lancashire | ............ | H04N 19/98 342/25 R |
| 9,541,637 B2 | 1/2017 | Searcy et al. | | |
| 2011/0099295 A1* | 4/2011 | Wegener | ................ | H03M 7/46 711/170 |
| 2013/0054661 A1* | 2/2013 | Wegener | ................ | H03M 7/40 708/203 |
| 2015/0048970 A1* | 2/2015 | Schoor | .................... | G01S 13/32 342/149 |

(Continued)

FOREIGN PATENT DOCUMENTS

WO    2015185058 A1    12/2015

OTHER PUBLICATIONS

IEEE STD 754-2019, Jul. 22, 2019 (Year: 2019).*

(Continued)

*Primary Examiner* — Olumide Ajibade Akonai
*Assistant Examiner* — Yonghong Li
(74) *Attorney, Agent, or Firm* — NORTON ROSE FULBRIGHT US LLP; Gerard A. Messina

(57) ABSTRACT

A method for encoding and storing digital data, which include a plurality of real values, in a signal processing unit of a radar sensor in which at least one real value r in an exponential representation in the form $r = m \cdot b^{-k}$ is stored, where m is a digital mantissa having a length p, b is a base, and k is a positive number that is encoded as a digital number having a length q. An exponential representation with $b > 2$ is used for the compressed storage of the values r.

17 Claims, 10 Drawing Sheets

(56) References Cited

U.S. PATENT DOCUMENTS

2017/0054449 A1* 2/2017 Mani .................. H03M 7/4031

OTHER PUBLICATIONS

Complex number—Wikipedia.pdf from https://web.archive.org/web/20180826133842/http://en.wikipedia.org/wiki/Complex_number (Year: 2018).*

"Floating-point arithmetic—Wikipedia.pdf" from https://web.archive.org/web/20190814181942/http://en.wikipedia.org:80/wiki/Floating-point_arithmetic (Year: 2019).*

"Exponential-Golomb coding—Wikipedia.pdf" from https://web.archive.org/web/20180919032249/http://en.wikipedia.org:80/wiki/Exponential-Golomb_coding (Year: 2018).*

* cited by examiner p =8, q=3, b=4
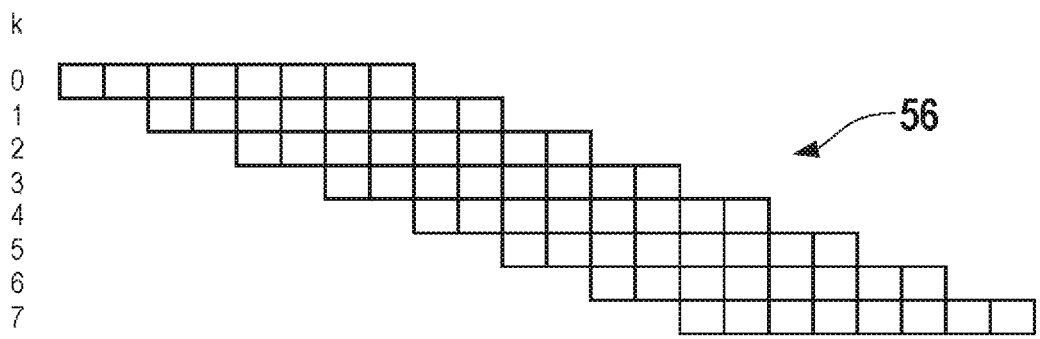
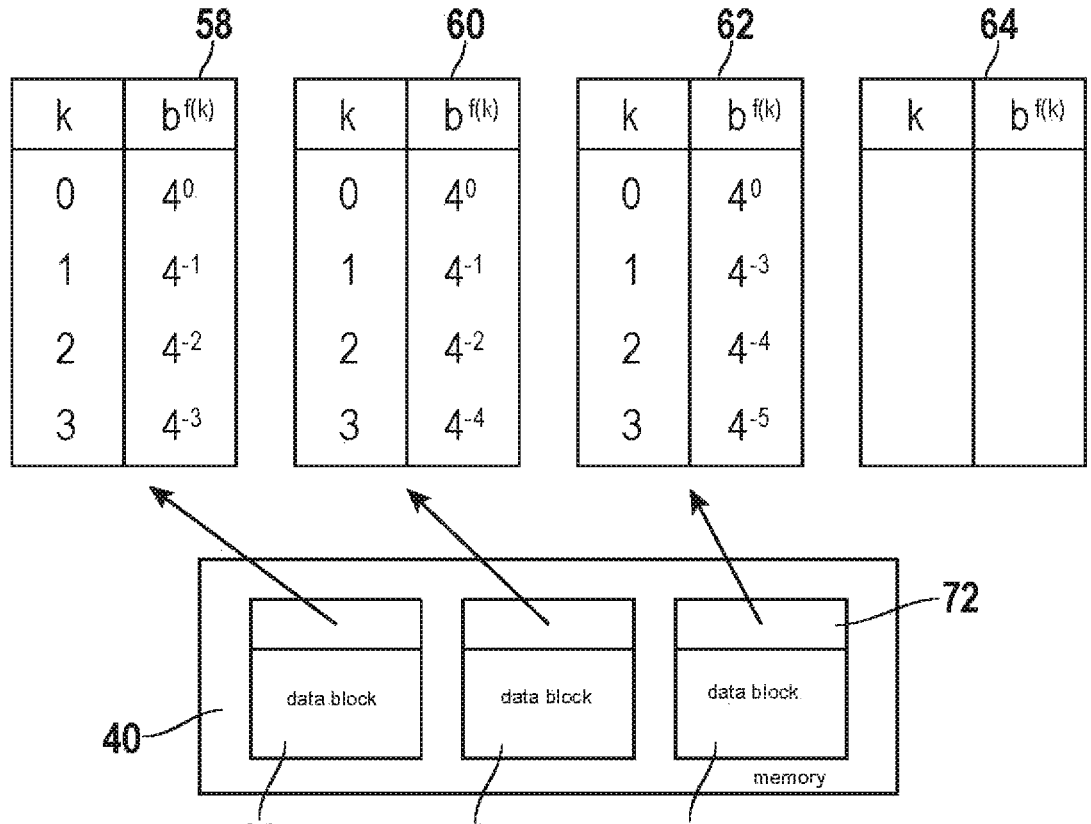
Fig. 6
Fig. 7

FMCW RADAR SENSOR INCLUDING SYNCHRONIZED HIGH FREQUENCY COMPONENTS

CROSS REFERENCE

The present application claims the benefit under 35 U.S.C. § 119 of German Patent Application No. DE 102019213621.4 filed on Sep. 9, 2019, and German Patent Application No. DE 102019215191.4 filed on Oct. 2, 2019, both of which are incorporated herein by reference in their entireties.

FIELD

The present invention relates to a method for encoding and storing digital data, which include a plurality of real values, in a signal processing unit of a radar sensor in which at least one real value r in an exponential representation in the form $$r = m \cdot b^{-k}$$

is stored, where m is a digital mantissa having a length p, b is an integer base, and k is a positive number that is encoded as a digital number having a length q.

In particular, the present invention relates to the encoding and storing of digital data in a radar sensor for motor vehicles.

BACKGROUND INFORMATION

In radar sensors for motor vehicles, the transmitted radar signal is generally a cyclically frequency-modulated signal, for example a sequence of frequency ramps emitted in succession, or also a sequence of so-called orthogonal frequency-division multiplexing (OFDM) symbols. The signals received from the located objects are downmixed into a low-frequency baseband, and after preamplification are digitized with the aid of an analog/digital converter. Thus, for each modulation cycle a time signal in the form of a vector x(n) is obtained, whose components are real or complex, depending on the demodulation method used, and are digitally represented. The number of components, i.e., the dimension of the vector, corresponds to the number of measuring points in time at which the signal is evaluated within the modulation cycle.

Vector x(n) may be converted via at least one Fourier transform (FFT, for example) into a vector V(k) whose complex components indicate the amplitude and phase of the received signal as a function of frequency k. The dimension of this vector corresponds to the number of frequency bins on the frequency axis, and thus determines the frequency resolution.

In many conventional radar systems for motor vehicles, each modulation cycle includes a plurality of successive frequency ramps or OFDM symbols that may be counted with the aid of an index y. In this case, a two-dimensional matrix may be formed by a further fast Fourier transform of the vectors $V_y(k)$ via index y. Each cell of this matrix then represents a combination of a distance d and a relative velocity v, and the cells, in which the value obtained via the two-dimensional FFT assume a maximum, represent objects that have been located at distance d and with relative velocity v.

When the radar sensor includes an array with multiple receiving antennas, and the signals of the receiving antennas are evaluated in separate reception channels, the azimuth angle and/or elevation angle at which the object is located may thus also be determined based on the amplitude and phase relationships of the signals that are obtained in the various channels for the same object.

With increasing demands on the distance resolution and angular resolution of the radar sensor, the number of reception channels increases, and within each reception channel the dimension of vectors x(n) and V(k) to be processed likewise increases, so that a considerable data volume is to be processed within each modulation cycle. This requires not only fast processors, but also a high memory capacity for the temporary storage of the digital input values as well as the intermediate results obtained in each processing step. The increased demand for memory capacity results in increased chip size and higher costs, as well as greater energy requirements.

According to ANSI/IEEE Standard 754-1985, digital representations of real numbers are stored in the form $r = m \cdot 2^{-k}$. The memory requirements for each real number are then specified by the sum of length p of mantissa m and length q of exponent k. The representation of a complex number requires two real numbers, for example a real part and an imaginary part.

U.S. Pat. No. 9,541,637 B2 and PCT Application No. WO 2015/185058 A1 describe methods with which memory requirements are to be kept within limits by data compression.

SUMMARY

An object of the present invention is to provide a method with which the memory requirements may be further reduced, or for a given memory space, the location accuracy may be improved.

This object may be achieved according to an example embodiment of the present invention with a method in which an exponential representation with b>2 is used for the compressed storage of the values.

As the result of using a larger integer base instead of the standard base b=2, for a given total length of the mantissa and of the exponent a higher resolution may be achieved for a significant portion of the values to be stored. Conversely, this means that for given requirements for the resolution, the length of the mantissa and/or of the exponent may be reduced, and memory space is thus saved.

Advantageous embodiments and refinements of the present invention are described herein.

In one advantageous specific embodiment, base b used is a power of two, for example b=4 or b=8. The conversion of the exponential representation from one base (b=2, for example) to another (b=4, for example) may then be carried out very easily, and requires very little additional computing time. Optionally, it is also possible to generate the values in the exponential representation during the digitization in the analog/digital converter, with b<2.

According to one advantageous refinement of the present invention, the values are transformed into an exponential representation in the form $$r = m^* \cdot b^{-f(k)},$$

where m* is the mantissa and f is a function of k that is selected from multiple functions, and the selection of function f takes place based on a value distribution of the values to be stored.

Depending on the value distribution of the values to be stored, certain lower powers of $b^{-1}$ may not be necessary at all in the exponential representation. Function f may then be selected in such a way that instead of these unnecessary powers, higher powers that allow a higher resolution appear in the exponential representation. Digital number k having length q is then used to encode, instead of the $2^q$ lowest powers of $b^{-1}$, another, more suitable selection of powers in order to achieve a higher resolution without additional memory requirements.

The selection of function f may take place before initial start-up of the radar sensor. The selection criterion is then the probable value distribution of the values to be stored, which are most likely with regard to the properties, operating conditions, and tasks of the radar sensor.

However, the selection of function f may also be dynamically varied during operation of the radar sensor, for example when there is a change in the requirement profile of the radar sensor, or optionally also based on a random or continuous statistical analysis of the value distribution of the data to be stored.

Exemplary embodiments are explained in greater detail below with reference to the figures.

BRIEF DESCRIPTION OF THE DRAWINGS

FIGS. 4 through 6 show examples of the encoding of digital values according to a first exemplary embodiment of the present invention.

FIG. 7 shows a memory architecture for an encoding method according to a further exemplary embodiment of the present invention.

FIG. 11 shows a diagram for explaining one modification of the method according to FIGS. 8 through 10.

DETAILED DESCRIPTION OF EXAMPLE EMBODIMENTS

Figure 1:
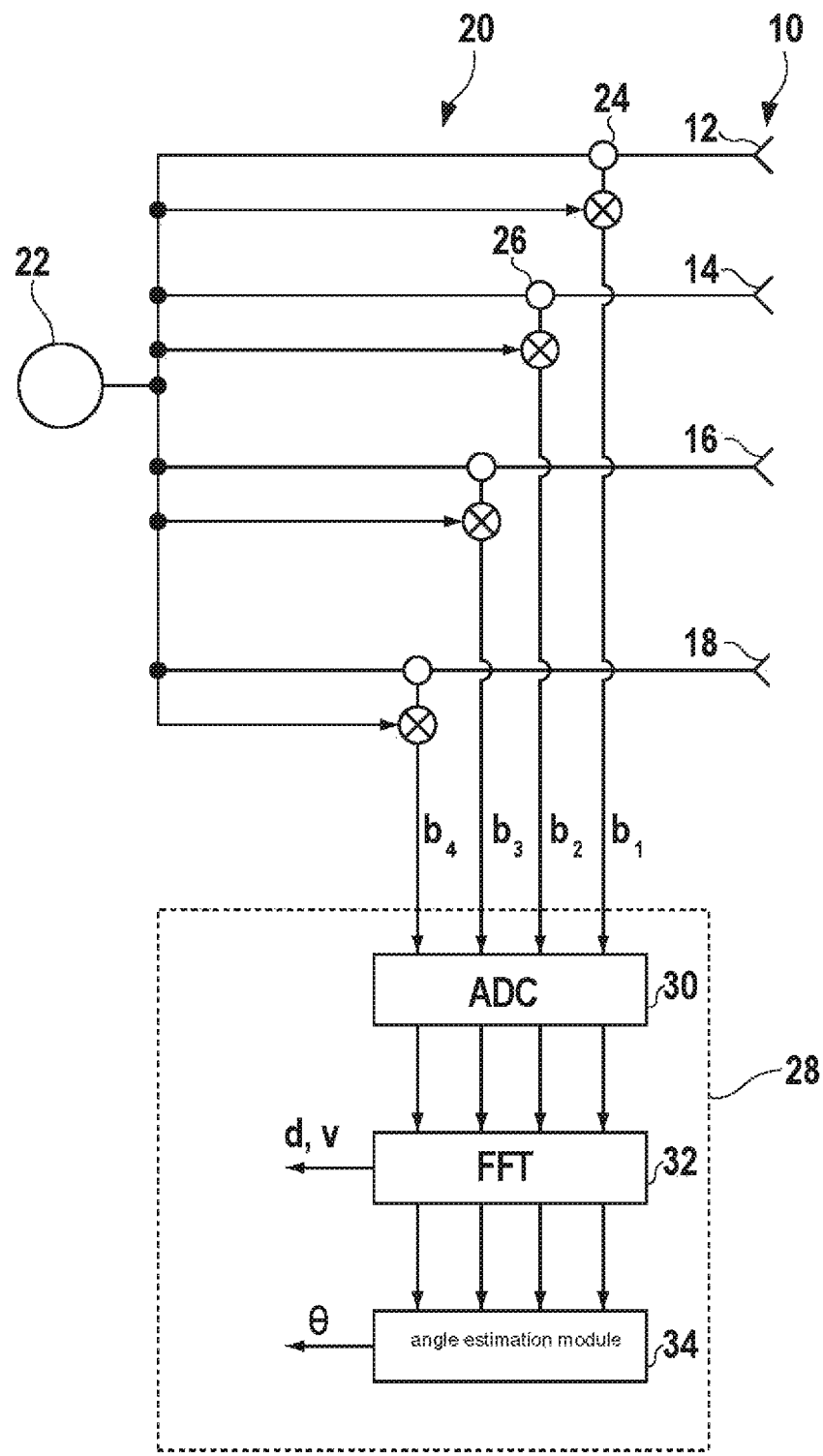
FIG. 1 shows a simplified circuit diagram of a radar sensor to which the present invention may be applied.

FIG. 1 shows by way of example an FMCW radar sensor that includes a transceiver 10 with four antenna elements 12, 14, 16, 18, which together form a planar group antenna. The radar sensor is installed in the motor vehicle in such a way that antenna elements 12 through 18 are adjacently situated at the same height, so that a certain angular resolution capability of the radar sensor in the horizontal (in the azimuth) is achieved.

A high-frequency portion 20 for controlling the antenna elements is formed, for example, by one or multiple monolithic microwave integrated circuits (MMICs), and includes an oscillator 22 that feeds a transmission signal into the individual antenna elements. The frequency of the transmission signal is periodically modulated in the form of a sequence of rising and/or falling frequency ramps. For example, each modulation cycle includes a sequence of so-called "rapid chirps," i.e., frequency ramps having the same slope, and each with a certain frequency shift relative to one another. The radar echoes received from antenna elements 12 through 18 are decoupled in each case with the aid of a circulator 24 and supplied to a mixer 26, where they are mixed with the transmission signal delivered by oscillator 22. In this way, a baseband signal b1, b2, b3, b4, which is supplied to an electronic control and evaluation device 28, is obtained for each of the antenna elements.

Control and evaluation device 28 contains a four-channel analog/digital converter 30 which digitizes and records baseband signals b1 through b4 obtained from the four antenna elements. The digital time signals thus obtained are then further processed channel by channel in a signal processing unit 32. For example, the time signals for each ramp are converted via a fast Fourier transform into spectra, which then undergo a further Fourier transform via the ramp index. A two-dimensional spectrum is thus obtained, from which distances d and relative velocities v of located objects may be read off.

The values obtained via the Fourier transforms are complex numbers that indicate the amplitudes and the phases of the received signals. Since the amplitude and phase relationships of the signals, which are received in the various reception channels from the same object, are a function of the azimuth angle of the object in question, azimuth angle θ of the objects may also be determined with a certain accuracy in an angle estimation module 34.

Figure 2:
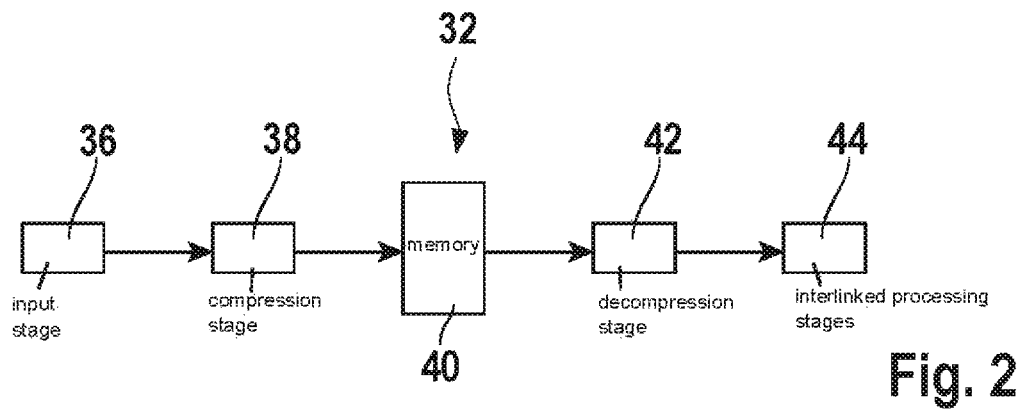
FIG. 2 shows a block diagram of a digital signal processing unit in the radar sensor according to FIG. 1.

Maint components of signal processing unit 32 are illustrated as a block diagram in FIG. 2. The signal processing unit includes an input stage 36 which accepts the digital data from analog/digital converter 30. The data are compressed in a compression stage 38 according to a method that is explained in greater detail below. The data are then stored in compressed form in a memory 40. When the data are to be further processed, they are decompressed in a decompression stage 42 and then further processed in a processing stage 44.

Signal processing unit 32 may also include multiple interlinked processing stages 44, for example two FFT stages for a two-dimensional Fourier transform. The processing results of the first stage are then recompressed and stored in a further memory, which the downstream processing stage then accesses via a further decompression stage. In certain applications, processing stage 44 or a downstream processing stage may also be designed in such a way that it may directly process the compressed data when they are stored in memory 40. Decompression stage 42 is then bypassed, or forwards the data unchanged. It is likewise possible for a processing stage to change the compressed data directly in memory 40. The downstream processing stage then accesses same memory 40.

Figure 3:
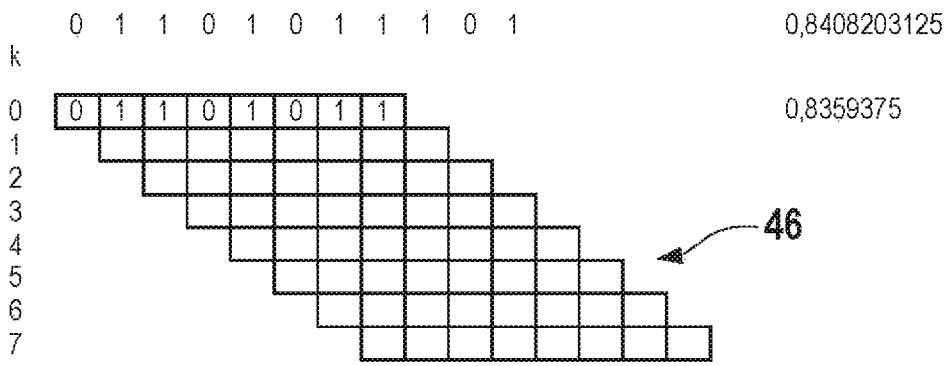
FIG. 3 shows examples of the encoding of digital values in a standard format.
Figure 3:
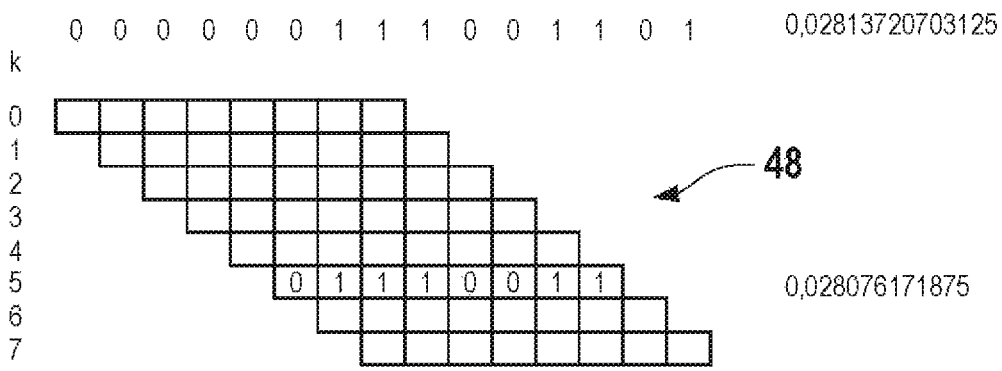

According to the IEEE 754-1985 standard, real values are encoded and stored in an exponential representation in the form $r=m \cdot b^{-k}$, where b=2, m is a mantissa having a length p of 8 bits, for example, and k is a positive integer having a length q of 3 bits, for example. FIG. 3 shows the digitization of a decimal number 0.8408203125 as an example. In binary fixed-point representation, this number is represented by the bit sequence 01101011101, which has a length of 11 bits. Above this bit sequence, the values of the associated binary digits are indicated as negative powers of two in FIG. 3. The most significant bit has the value $2^0$, the next bit has the value $2^{-1}$, etc.

A table 46 in FIG. 3 illustrates the conversion of this fixed-point number into the standard-exponential representation, with p=8, q=3, and base b=2. Since exponent k has length q=3, k may assume values from 0 to 7. Accordingly, table 46 includes eight rows. Since the mantissa has length p=8, in the conversion to the exponential representation the three least significant bits of the original bit sequence must be dropped. The eight-digit mantissa is entered into the row in table 46 which (for positive numbers) is situated one digit left of the first bit of the original 11-bit sequence that is different from 0, thus, in row k=0 in the present example. The stored value is thus to be interpreted as $$r = m_0 \cdot 2^{-0} + m_1 \cdot 2^{-1} + \ldots + m_7 \cdot 2^{-7},$$

where $m_i$ (i=0 to 7) is the ith digit of mantissa m.

In the present example, the mantissa is indicated in the two's complement format. In this format, for positive numbers the most significant bit (at the left end of the sequence) must be equal to 0, while for negative numbers the most significant bit must be equal to 1. When the original bit sequence contains more than one leading 0, the leading zeroes except for the last one may be omitted, and for each omitted 0, exponent k is increased by 1.

A table 48 in FIG. 3 shows the encoding of the decimal number 0.02813720703125 as an example. The associated bit sequence includes six leading zeroes. Of these, five zeroes are omitted, and the remaining mantissa (the next 8 digits) is entered in row k=5.

Similarly, for negative numbers the leading ones except for the last may be omitted. Since for the omitted leading digits, additional least significant bits may be incorporated into the mantissa, higher accuracy in the representation of the real number is achieved in the exponential representation.

For the case illustrated in table 46, underneath the original decimal number 0.840 . . . the value of the decimal number after conversion into the exponential representation is indicated: 0.8359375. A comparison of the two decimal numbers shows that limiting the mantissa to 8 bits results in a quantization error in the range of 0.004.

Also for the case illustrated in table 48, the decimal numbers that correspond to the original bit sequence and to the exponential representation are indicated. It is apparent that the quantization error is much smaller here due to the scaling by k=5 digits.

Figure 4:
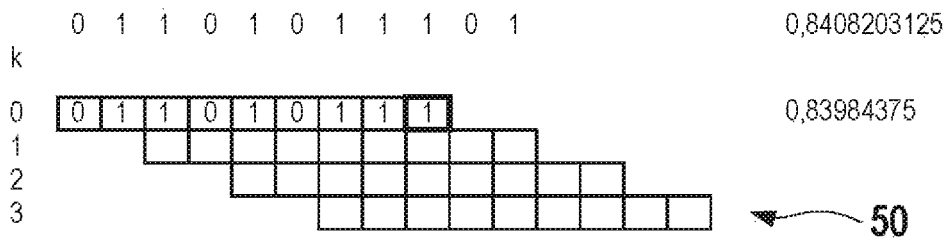

In FIG. 4, a table 50 illustrates the encoding in an exponential representation according to a method according to the present invention, using the same decimal number as in FIG. 3 (table 46) as an example. The special feature of this method is that base b=4 is used, not customary base b=2. The increase of exponent k by 1 thus corresponds to multiplying by the factor $2^{-2}$. Accordingly, in table 50 the rows are each shifted by two digits relative to one another. In order to cover the same dynamic range as in FIG. 3 (digits from $2^0$ to $2^{-14}$), exponents k in the range of 0 to 3, which may be encoded by a 2-bit word, are sufficient. Length q may thus be reduced from 3 to 2. As a result, either memory space is saved, or the bit that is freed up is utilized to increase length p of the mantissa from 8 to 9, so that greater accuracy is achieved and the quantization error is reduced.

In table 50 the mantissa has a length of 9 bits, so that of the original 11-bit word, only the last two digits need to be discarded. The associated decimal numbers are likewise indicated in FIG. 4, and show that the quantization error has decreased to approximately 0.001.

Figure 5:
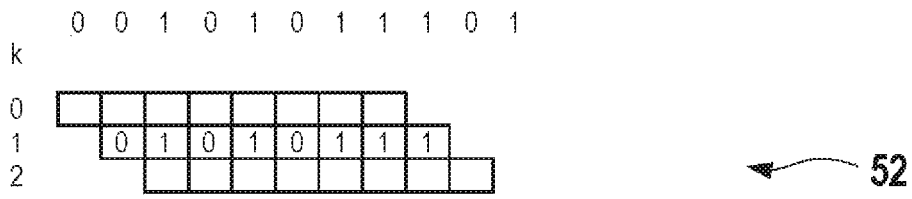
Figure 5:
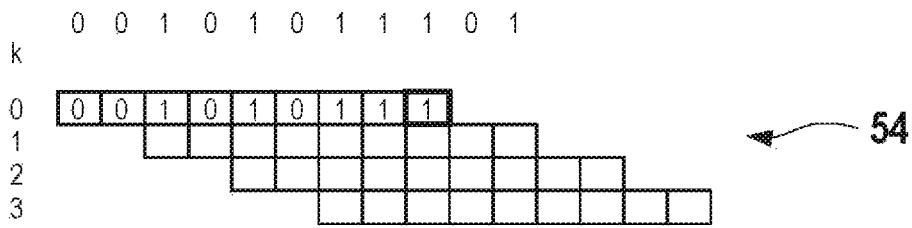

However, the method applied in this example does not result in a reduction in the quantization error for every real number. A counterexample is shown in FIG. 5. First, a table 52 illustrates the conventional exponential representation with base b=2, p=8, and q=3 for an 11-bit word, which in this example has two leading zeroes. In the conventional method, the leading 0 is deleted and the exponent is increased to k=1. Thus, of the original 11-bit word, only the last two bits need to be discarded.

A table 54 in FIG. 5 illustrates the method according to the present invention for the same 11-bit word, with b=4, p=9, and q=2. If k were to be increased from 0 to 1, the two leading zeroes would have to be deleted. However, for the remaining mantissa the most significant bit would then be a 1, which in two's complement format would correspond to a negative number. Therefore, in table 54 the encoding must take place with k=0, and the same data loss as in table 52 results, even though the mantissa is lengthened to nine digits.

When a plurality of real values is to be encoded, and the magnitudes of these values are approximately equally distributed, in approximately one-half of the cases the number of leading zeroes will be odd, as in FIG. 4, and a reduction in the quantization error is achieved, while in the other half of the cases the number of leading zeroes (or ones) will be even, so that no advantage results over the conventional method. However, on a statistical average, use of the method according to the present invention always results in a significant improvement in the accuracy for one-half of the data.

In FIG. 6, a table 56 illustrates one variant of the method according to the present invention, with base b=4 and with conventional length p=8 of the mantissa and conventional length q=3 of exponent k. Overall, for storing the mantissa and the exponent this results in the same memory space requirements (11 bits) as in FIGS. 3 through 5. Although in this case no greater accuracy is achieved by lengthening the mantissa, with the same 11 bits as in the related art a significantly greater dynamic range, namely, of $2^0$ to $2^{-21}$, may be covered.

Processing stages 44 in signal processing unit 32 are each designed for a certain task, and the essential features of the data structure of the data to be processed and to be stored are known in advance. Thus, for each individual processing stage 44 it may be individually determined which variant of the method according to the present invention should be used. When a large dynamic range is required, q will be increased. When the expected dynamic range is smaller, p may be increased, thus achieving greater accuracy. In certain cases it may also be advantageous to operate with an even larger base, for example b=8; the base should preferably be a power of two.

FIG. 7 illustrates an encoding method according to a second exemplary embodiment of the present invention. In this exemplary embodiment, k does not directly indicate the exponent in the exponential representation, and instead k is merely the argument of a function f(k), whose function value then determines the exponent. The exponential representation thus has the form:

$$r = m^* \cdot b^{f(k)},$$

where the mantissa is denoted here by m*.

FIG. 7 shows examples of value tables 58, 60, 62, 64, each of which defines a different function f. In value tables 58, 60, and 62 the association of the function values or of the powers $b^{f(k)}$ formed from same is explicitly indicated for arguments k.

The advantage of this method is that, also for a given length q=2 of argument k to be stored, one is not limited to the four lowest powers $4^0$, $4^{-1}$, $4^{-2}$, and $4^{-3}$ (as in value table 58), but instead, some other set of four powers of four may be selectively used, as shown in the example in value tables 60 and 62. The selection of function f and of the associated value table may then be based on which set of powers best fits the expected or previously found structure of the data to be stored. This is explained in greater detail below.

The data in this example are stored in memory 40 in various data blocks 66, 68, 70, and for each data block an indicator 72 which refers to one of value tables 58 through 64 is additionally stored. The data in each data block are encoded and decoded with function f, which is indicated by indicator 72.

Figure 8:
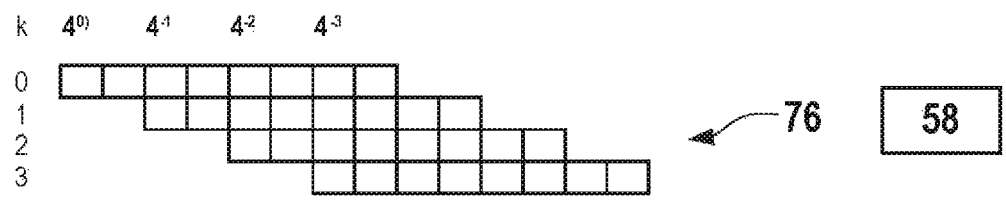
FIGS. 8 through 10 show examples of the encoding of data according to the method according to the second exemplary embodiment of the present invention.
Figure 8:
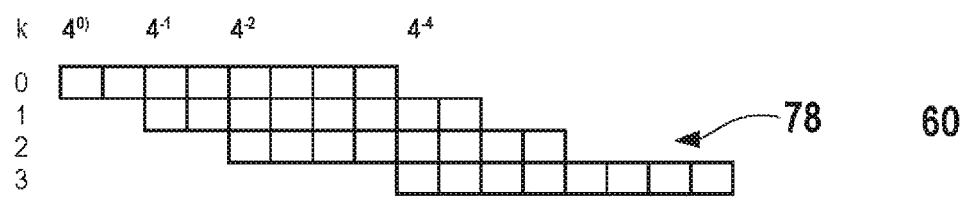
Figure 8:
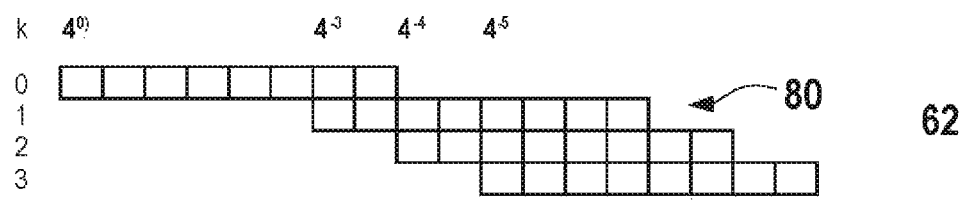

FIG. 8 shows a data set 74 to be stored, which in this simplified example is made up of only five bit sequences, each having a length of 22 bits. However, the dynamic range in this example is only 14 bits, since all least significant bits are 0. The first three bit sequences correspond to real numbers in the range $2^0$, while the last two bit sequences indicate smaller numbers in the range of $2^{-4}$ or $2^{-6}$.

In addition, FIG. 8 shows three tables 76, 78, 80, each of which represents the exponential representation with one of functions f shown in FIG. 7. Associated value tables 58, 60, and 62 are likewise indicated in FIG. 8.

To check how well, for example, the exponential representation according to table 76 is suited for data set 74, for each bit sequence in data set 74 a row may now be selected from table 76 with which the bits that are different from 0 may be optimally covered. The bits covered in this way are denoted in data set 74 by a frame 82. It is apparent that the first bit sequence may be completely covered by row k=0, and the last bit sequence may be completely covered by row k=3. For the three other bit sequences, several least significant bits are lost in each case.

When the same procedure is now repeated with tables 78 and 80, it is apparent that the overall data loss that occurs is greater for these tables. Therefore, for encoding data set 74, function f that is defined by value table 58 (table 76) would be selected.

Figure 9:
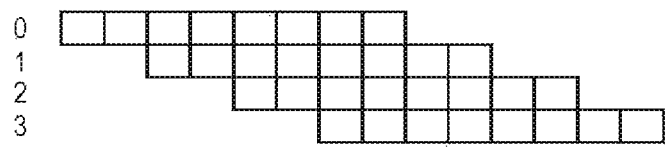
Figure 9:
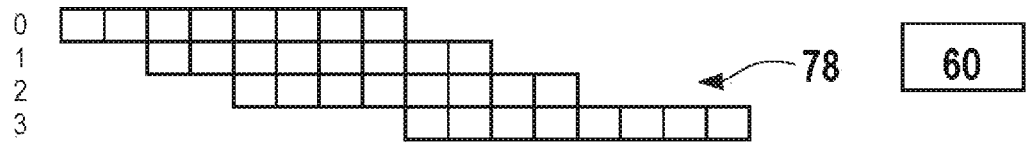
Figure 9:
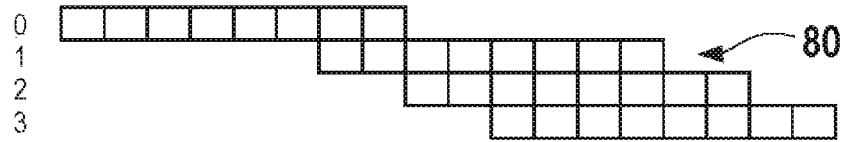
Figure 10:
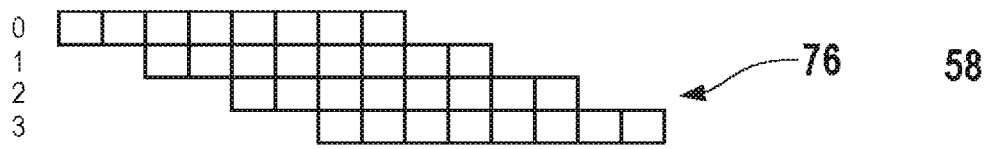
Figure 10:
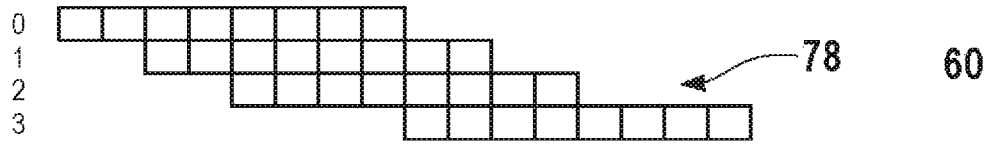
Figure 10:
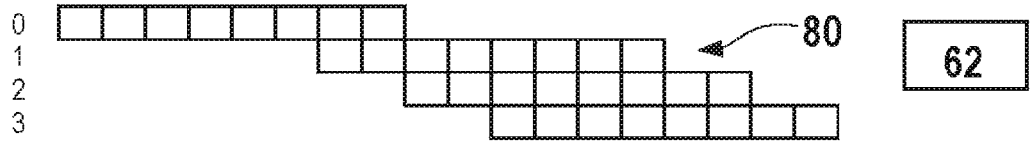

Analogously, FIG. 9 shows an example of a data set 84 that may be best mapped with value table 60 (table 78), and FIG. 10 shows an example of a data set 86 that may be best mapped with value table 62 (table 80).

An error measure, for example the sum of the quantization error, the average quadratic deviation, etc., may be computed as a criterion for selecting best suited function f.

Figure 11:
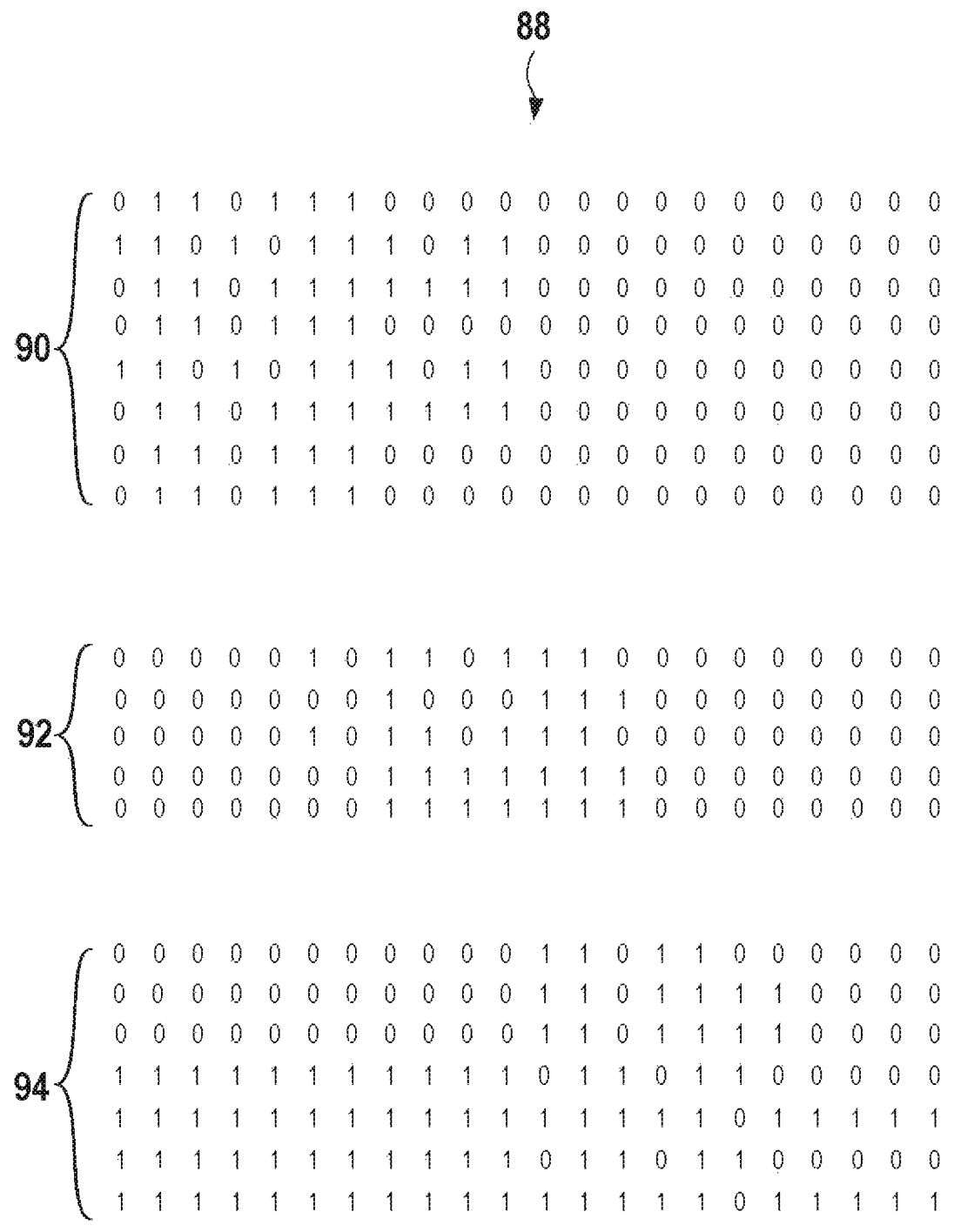

FIG. 11 shows a more comprehensive data set 88 that includes a total of twenty bit sequences. These bit sequences are ordered, at least roughly, in decreasing value of the real numbers that are represented by the bit sequence. This corresponds to a situation that is frequently encountered in practice. For example, the bit sequences could represent the amplitudes of received radar echoes with increasing frequencies and correspondingly increasing object distances. The sorting by decreasing values then automatically results due to the fact that the radar echoes become weaker with increasing object distance.

To minimize the memory requirements and/or to increase the accuracy, it is now advantageous to divide such an ordered or partially ordered data set into individual blocks 90, 92, 94, and for each block to select function f that best fits the data structure of this block. For example, if a function f in whose value range low powers of four predominantly occur were selected for block 90, while for block 94 a function in whose value range predominantly high powers of four predominantly occur were selected, the leading zeroes or ones occurring in all bit sequences in block 94 may be scaled off.

When the field of application of the radar sensor is known, the selection of function f or of functions f for various blocks, as well as the base to be used (p=4 or greater) and length p of the mantissa and length q of argument k, may be set before initial start-up of the radar sensor. However, in a further embodiment it is also possible to dynamically adapt these parameters during operation of the radar sensor, based on the instantaneous data to be processed.

Instead of defining functions f with the aid of predefined and stored value tables 58, 60, 62, in a further embodiment it is also possible to generate function f, to be applied in each case, directly during the data compression by selecting those powers of four with which the significant bits in the bit sequences to be compressed may be best covered.

Figure 12:
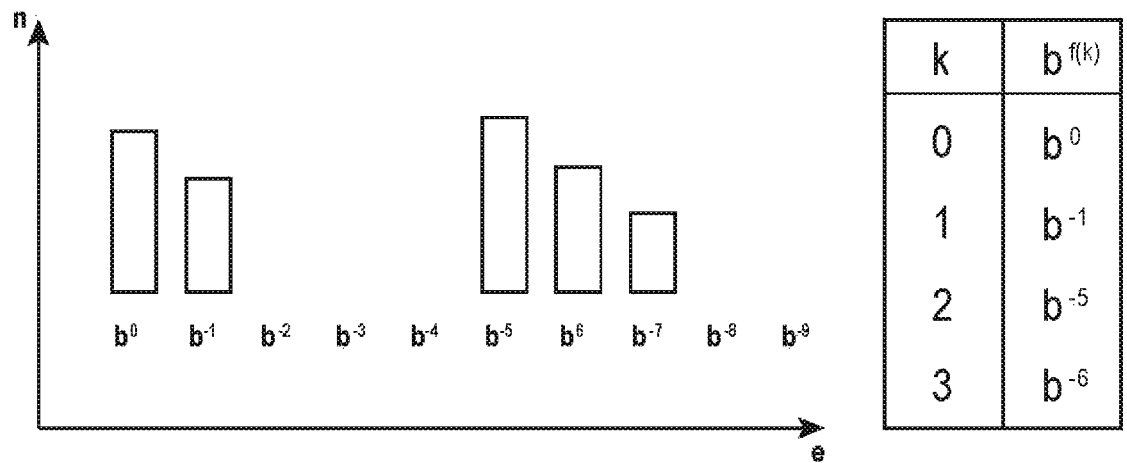
FIGS. 12 and 13 show histograms for explaining a further variant of the method according to the second exemplary embodiment of the present invention.
Figure 13:
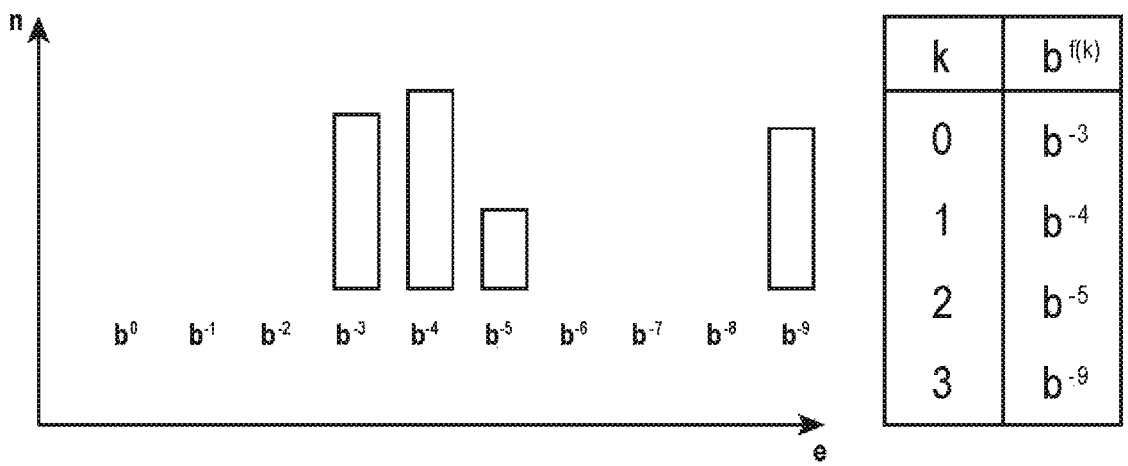

For example, the selection or generation of functions f may take place based on a statistical analysis in which, based on the bit sequences to be stored, a histogram is created which for each power e of base b indicates number n of bit sequences whose highest significant bit (after deleting the leading ones or zeroes) is in the interval between $b^{-e}$ and $b^{-e-1}$. Examples of such histograms are shown in FIGS. 12 and 13. In FIG. 12, the values of the highest significant bits are either in the range of $b^0$ to $b^{-1}$ or in the range of $b^{-5}$ to $b^{-7}$. However, since with an argument k of length 2 only four different powers may be indicated, among the powers that occur, if at all, the four lowest powers, in the present example $b^0$, $b^{-1}$, $b^{-5}$, and $b^{-6}$, are selected. Bit sequences whose significant bits begin with $b^{-7}$ are encoded in the form $m \cdot b^{-6}$, for which a certain data loss must be accepted.

FIG. 13 shows an example in which the highest significant bits are either in the range of $b^{-3}$ to $b^{-5}$ or are $b^{-9}$. Therefore, in this case powers $b^{-3}$, $b^{-4}$, $b^{-5}$, and $b^{-9}$ are selected.

Figure 14:
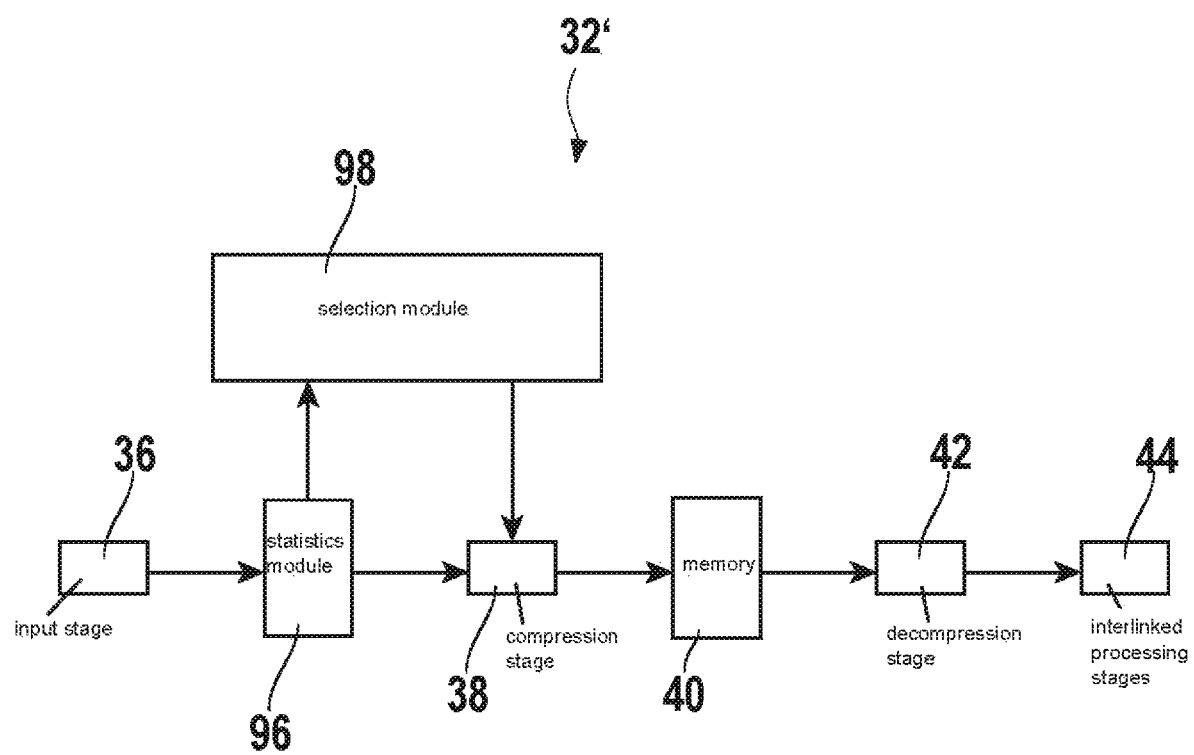
FIG. 14 shows a block diagram of a signal processing stage for the method according to the second exemplary embodiment of the present invention.

FIG. 14 shows a block diagram of a signal processing unit 32' in which the parameters for the data compression may be dynamically adapted. Inserted between input stage 36 and compression stage 38 is a statistics module 96, which carries out a statistical analysis on the data received from input stage 36, for example by creating histograms of the type shown in FIGS. 12 and 13. A subdivision of the data set, to be stored, into blocks having a similar data structure optionally takes place in this statistics module 96. The results of the statistical analysis for the complete data set or for the block considered at that moment are then transferred to a selection module 98, which determines the value table for function f to be applied, and optionally optimal parameters p and q and possibly also base b, when these parameters are to be greater than 4. The parameters (and functions) determined by selection module 96 are transferred to compression stage 38, where they are used for data compression.

The compressed data, together with the parameters used (or an indicator for the parameter set used), are then stored block by block in memory 40.

Only the encoding of real numbers is considered in the method described thus far. However, it is understood that the method may also be applied to complex numbers, since any complex number may be expressed by two real numbers, for example by its real part and its imaginary part, or also by its magnitude and the phase. The above-described encoding method may then be used for encoding each, or at least one, of the two real numbers that represent the complex number. For example, the exponential representation may be used for the magnitude, and a fixed-point representation may be used for the phase. In many applications in a radar sensor, this representation of complex numbers is particularly advantageous, since in the data evaluation a phase compensation is often required, which is simplified to a mere addition of the phases in the representation of the complex values by magnitude and phase. Application examples include the phase compensation for a synthetic aperture radar (SAR) or also the phase compensation for radar sensors with OFDM modulation.

What is claimed is:

1. A method for encoding and storing digital data for a radar sensor of a vehicle, which include a plurality of real values, the method comprising:

storing, in a signal processing unit of the radar sensor of the vehicle, at least one real value r is in an exponential representation in which $r=m*b^{-f(k)}$, where m* is a digital mantissa and f is a function of k that is selected from multiple functions, where the digital mantissa has a length p, b is a base, and k is a positive number that is encoded as a digital number having a length q;

wherein the exponential representation with b>2 is used for providing compressed storage of the at least one real value r, and wherein a complex number is represented by its magnitude and its phase, and the exponential representation is used for the magnitude, so that a memory requirement is reduced, or for a given memory space, an object location accuracy is improved based on a statistical analysis of the digital data and/or a quantization error is reduced, wherein the signal processing unit includes an input stage which accepts digital data from an analog/digital converter, wherein the digital data are compressed in a compression stage and the compressed data are stored in compressed form in a memory of the radar sensor, and the compressed data are later decompressed in a decompression stage and further processed in a processing stage, wherein by using a larger integer base of b>2, it is provided that for a length of a digital mantissa and of the exponent k a higher resolution is achieved for a portion of the real values to be stored, so that for a particular resolution, the length of the digital mantissa and/or of the exponent k is reduced to save memory space in the radar sensor of the vehicle, wherein the radar sensor includes a frequency modulated continuous wave (FMCW) radar having a transceiver and a plurality of antenna elements forming a planar group antenna, wherein the radar sensor is installed in the vehicle so that the antenna elements are adjacently situated at a same height, so that a particular angular resolution capability of the radar sensor, in an azimuth, is achieved, wherein the multiple functions from which the function f is selected are stored in advance in a form of value tables, and wherein the selection of the function f and of an associated value table is based on which set of powers best fits an expected or a previously found structure of the digital data to be stored.

2. The method as recited in claim 1, wherein b is a power of two.

3. The method as recited in claim 1, wherein p and q are determined as a function of an expected data structure of values to be stored.

4. The method as recited in claim 3, wherein during operation of the radar sensor, p and/or q and/or b are dynamically adapted to the expected data structure of values to be stored.

5. A method for encoding and storing digital data for a radar sensor of a vehicle, which include a plurality of real values, the method comprising:

storing, in a signal processing unit of the radar sensor of the vehicle, at least one real value r, which is in an exponential representation in which $r=m*b^{-k}$, where m* is a digital mantissa having a length p, b is a base, and k is a positive number that is encoded as a digital number having a length q;

wherein the exponential representation with b>2 is used for providing compressed storage of the at least one real value r, and wherein for the compressed storage, the at least one real value r is in an exponential representation in which $r=m*b^{-f(k)}$, where f is a function of k that is selected from multiple functions, and the selection of the function f takes place based on a value distribution of values to be stored, so that a memory requirement is reduced, or for a given memory space, an object location accuracy is improved based on a statistical analysis of the digital data and/or a quantization error is reduced, wherein the signal processing unit includes an input stage which accepts digital data from an analog/digital converter, wherein the digital data are compressed in a compression stage and the compressed data are stored in compressed form in a memory of the radar sensor, and the compressed data are later decompressed in a decompression stage and further processed in a processing stage, and wherein by using a larger integer base of b>2, it is provided that for a length of a digital mantissa and of the exponent k a higher resolution is achieved for a portion of the real values to be stored, so that for a particular resolution, the length of the digital mantissa and/or of the exponent k is reduced to save memory space in the radar sensor of the vehicle, wherein the radar sensor includes a frequency modulated continuous wave (FMCW) radar having a transceiver and a plurality of antenna elements forming a planar group antenna, and wherein the radar sensor is installed in the vehicle so that the antenna elements are adjacently situated at a same height, so that a particular angular resolution capability of the radar sensor, in an azimuth, is achieved, wherein the multiple functions from which the function f is selected are stored in advance in a form of value tables, and wherein the selection of the function f and of an associated value table is based on which set of powers best fits an expected or a previously found structure of the digital data to be stored.

6. The method as recited in claim 5, wherein the selection of the function f is varied during operation of the radar sensor as a function of a data structure of the at least one value to be stored.

7. The method as recited in claim 5, wherein values of the selected function f are generated during operation of the radar sensor as a function of a data structure of the at least one value to be stored.

8. A method for encoding and storing digital data for a radar sensor of a vehicle, which include a plurality of real values, the method comprising:

storing, in a signal processing unit of the radar sensor of the vehicle, at least one real value r is in an exponential representation in which $r=m*b^{-f(k)}$, where m* is a digital mantissa and f is a function of k that is selected from multiple functions, where the m is a digital mantissa has a length p, b is a base, and k is a positive number that is encoded as a digital number having a length q;

wherein the exponential representation with b>2 is used for providing compressed storage of the at least one real value r, wherein p and q are determined as a function of an expected data structure of values to be stored, and wherein parameters and/or functions that are used for a data compression are determined based on a statistical analysis of data to be stored, so that a memory requirement is reduced, or for a given memory space, an object location accuracy is improved based on a statistical analysis of the digital data and/or a quantization error is reduced, wherein the signal processing unit includes an input stage which accepts digital data from an analog/digital converter, wherein the digital data are compressed in a compression stage and the compressed data are stored in compressed form in a memory of the radar sensor, and the compressed data are later decompressed in a decompression stage and further processed in a processing stage, and wherein by using a larger integer base of b>2, it is provided that for a length of a digital mantissa and of the exponent k a higher resolution is achieved for a portion of the real values to be stored, so that for a particular resolution, the length of the digital mantissa and/or of the exponent k is reduced to save memory space in the radar sensor of the vehicle, wherein the radar sensor includes a frequency modulated continuous wave (FMCW) radar having a transceiver and a plurality of antenna elements forming a planar group antenna, wherein the radar sensor is installed in the vehicle so that the antenna elements are adjacently situated at a same height, so that a particular angular resolution capability of the radar sensor, in an azimuth, is achieved, wherein the multiple functions from which the function f is selected are stored in advance in a form of value tables, and wherein the selection of the function f and of an associated value table is based on which set of powers best fits an expected or a previously found structure of the digital data to be stored.

9. The method as recited in claim 8, wherein a complex number is represented by its magnitude and its phase, and the exponential representation is used for the magnitude.

10. A radar sensor for a motor vehicle, comprising:
a signal processing unit to encode and store digital data in the radar sensor of the vehicle, which include a plurality of real values, wherein the signal processing unit is configured to perform the following:
storing at least one real value r is in an exponential representation in which $r = m^* \cdot b^{-f(k)}$, where $m^*$ is a digital mantissa and f is a function of k that is selected from multiple functions, where the digital mantissa has a length p, b is a base, and k is a positive number that is encoded as a digital number having a length q;

wherein the exponential representation with b>2 is used for providing compressed storage of the at least one real value r, and wherein a complex number is represented by its magnitude and its phase, and the exponential representation is used for the magnitude, so that a memory requirement is reduced, or for a given memory space, an object location accuracy is improved based on a statistical analysis of the digital data and/or a quantization error is reduced, wherein the signal processing unit includes an input stage which accepts digital data from an analog/digital converter, wherein the digital data are compressed in a compression stage and the compressed data are stored in compressed form in a memory of the radar sensor, and the compressed data are later decompressed in a decompression stage and further processed in a processing stage, and wherein by using a larger integer base of b>2, it is provided that for a length of a digital mantissa and of the exponent k a higher resolution is achieved for a portion of the real values to be stored, so that for a particular resolution, the length of the digital mantissa and/or of the exponent k is reduced to save memory space in the radar sensor of the vehicle, wherein the radar sensor includes a frequency modulated continuous wave (FMCW) radar having a transceiver and a plurality of antenna elements forming a planar group antenna, wherein the radar sensor is installed in the vehicle so that the antenna elements are adjacently situated at a same height, so that a particular angular resolution capability of the radar sensor, an azimuth, is achieved, wherein the multiple functions from which the function f is selected are stored in advance in a form of value tables, wherein the selection of the function f and of an associated value table is based on which set of powers best fits an expected or a previously found structure of the digital data to be stored, and wherein the signal processing unit includes multiple interlinked processing stages, including multiple FFT stages for a multi-dimensional Fourier transform.

11. The radar sensor as recited in claim 10, wherein b is a power of two.

12. The radar sensor as recited in claim 10, wherein p and q are determined as a function of an expected data structure of values to be stored.

13. The radar sensor as recited in claim 12, wherein during operation of the radar sensor, p and/or q and/or b are dynamically adapted to the the expected data structure of values to be stored.

14. The radar sensor as recited in claim 12, wherein parameters and/or functions that are used for a data compression are determined based on a statistical analysis of data to be stored.

15. The radar sensor as recited in claim 10, wherein the selection of the function f is varied during operation of the radar sensor as a function of a data structure of the at least one value to be stored.

16. The radar sensor as recited in claim 10, wherein values of the selected function f are generated during operation of the radar sensor as a function of a data structure of the at least one value to be stored.

17. The radar sensor as recited in claim 10, wherein b is a power of two, wherein p and q are determined as a function of an expected data structure of values to be stored, and wherein during operation of the radar sensor, p and/or q and/or b are dynamically adapted to the expected data structure of values to be stored.

* * * * *